United States Patent
Miki et al.

(10) Patent No.: US 11,692,098 B2
(45) Date of Patent: Jul. 4, 2023

(54) POLYAMIDE RESIN COMPOSITION, POLYAMIDE RESIN COMPOSITION FOR ROTATIONAL MOLDING AND ROTATIONAL MOLDED ARTICLE USING SAME

(71) Applicant: UBE Corporation, Ube (JP)

(72) Inventors: Yuya Miki, Ube (JP); Tetsuro Hiroki, Ube (JP); Masayoshi Baba, Ube (JP)

(73) Assignee: UBE CORPORATION, Ube (JP)

( * ) Notice: Subject to any disclaimer, the term of this patent is extended or adjusted under 35 U.S.C. 154(b) by 0 days.

(21) Appl. No.: 17/809,720

(22) Filed: Jun. 29, 2022

(65) Prior Publication Data

US 2022/0325102 A1 Oct. 13, 2022

Related U.S. Application Data

(62) Division of application No. 16/635,895, filed as application No. PCT/JP2018/030021 on Aug. 10, 2018, now abandoned.

(30) Foreign Application Priority Data

Sep. 12, 2017 (JP) .................. 2017-175203
Jan. 29, 2018 (JP) .................. 2018-012851

(51) Int. Cl.
 *C08L 77/06* (2006.01)
(52) U.S. Cl.
 CPC ......... *C08L 77/06* (2013.01); *C08L 2205/025* (2013.01); *C08L 2205/03* (2013.01)
(58) Field of Classification Search
 CPC .. C08L 51/00; C08L 51/003; C08L 77/00–06; C08L 2205/025; C08L 2205/04; C08L 2205/02; C08L 2205/03
 See application file for complete search history.

(56) References Cited

U.S. PATENT DOCUMENTS

| | | | |
|---|---|---|---|
| 5,886,096 | A | 3/1999 | Yoshida et al. |
| 6,875,812 | B1 | 4/2005 | Akiyama et al. |
| 2013/0261245 | A1 | 10/2013 | Tomic et al. |
| 2017/0031879 | A1 | 2/2017 | Xiong et al. |
| 2017/0313879 | A1 | 11/2017 | Kobayashi et al. |
| 2018/0362761 | A1 | 12/2018 | Nakano et al. |

FOREIGN PATENT DOCUMENTS

| | | | |
|---|---|---|---|
| JP | 55-036279 A | | 3/1980 |
| JP | 06-179784 A | | 6/1994 |
| JP | 09-019935 A | | 1/1997 |
| JP | 10-287743 A | | 10/1998 |
| JP | 2004-210853 A | | 7/2004 |
| JP | 2005-145995 A | | 6/2005 |
| JP | 2013-532748 | | 8/2013 |
| JP | 2014-25023 A | | 2/2014 |
| JP | 2014-062194 A | | 4/2014 |
| JP | 2015-220493 A | | 12/2015 |
| JP | 2017-88661 A | | 5/2017 |
| JP | 2017088661 A | * | 5/2017 |
| WO | WO 2009/069725 A1 | | 6/2009 |
| WO | WO 2017/094720 A1 | | 6/2017 |

OTHER PUBLICATIONS

JP 2017088661 A machine translation (May 2017).*
Extended European Search Report in corresponding European Patent Application No. 18855413.3, dated May 10, 2021.
Zhihan Peng et al., "Polyamides", pp. 9 and 10, Chemical Industry Press, Nov. 2001.
Jianxin He et al., "Novel Fiber Materials Science", pp. 264 to 266, Donghua University Press, Jul. 2014.
Zhengyuan Wang, et al., "Practical Handbook of Engineering Plastics", p. 87, China Logistics Publishing House, Jun. 1994.
Zhonghao Chen et al., "Packaging Materials", p. 180, Hunan University Press, Sep. 1989.

\* cited by examiner

*Primary Examiner* — Ana L. Woodward
(74) *Attorney, Agent, or Firm* — Knobbe, Martens, Olson & Bear LLP

(57) ABSTRACT

A polyamide resin composition having excellent low-temperature impact resistance and surface property, a polyamide resin composition for rotational molding and a rotational molded article using the same. The polyamide resin composition includes a component (A) in an amount of a parts by weight, which is an aliphatic polyamide having a relative viscosity $\eta r$ of less than 2.6 as measured according to JIS K6920 under the conditions of 96 wt % of sulfuric acid, 1 wt % of the polymer concentration, and 25° C.; a component (B) in an amount of b parts by weight, which is a modified polyolefin having a density of 0.895 g/cm$^3$ or less as measured according to ASTM D1505; and a component (C) in an amount of c parts by weight, which is a non-modified polyolefin having an MFR value of 3.0 to 30 g/10 min as measured in a load of 2.16 kg at 190° C., and the polyamide resin composition satisfies the following equations: $50 \leq c/(b+c) \times 100 \leq 70$, and $10 \leq (b+c)/(a+b+c) \times 100 \leq 40$.

5 Claims, No Drawings

POLYAMIDE RESIN COMPOSITION, POLYAMIDE RESIN COMPOSITION FOR ROTATIONAL MOLDING AND ROTATIONAL MOLDED ARTICLE USING SAME

RELATED APPLICATIONS

This application is a divisional of U.S. patent application Ser. No. 16/635,895, filed Jan. 31, 2020, which is the U.S. National Phase of PCT/JP2018/030021, filed Aug. 10, 2018, which claims priority to Japanese Patent Application No. 2017-175203, filed Sep. 12, 2017, the entire content of which is incorporated herein by reference.

TECHNICAL FIELD

The present invention relates to a polyamide resin composition suitable for rotational molding.

BACKGROUND ART

Recently, rotational molding has been drawing an attention because various types of small lot products can be molded at low cost. The material used is often polyethylenes, and the reason is that polyethylenes have excellent properties such as stability to heat deterioration, liquidity, and ease of grinding. On the other hand, although the material for rotational molding in the application for hollow molded articles storing pressurized gas such as pressurized gas containers is required to have high gas barrier properties in order to prevent the filled gas from flowing outside of the container, the requirement is not sufficiently satisfied when polyethylenes are used alone. Under such a background, the examination using a polyamide resin having excellent gas barrier properties has been actively performed as the material for rotational molding in the application for pressurized gas containers and fuel tanks.

However, in the application for pressurized gas containers and fuel tanks, the impact resistance at low temperature is further required. Therefore, the blend of an impact resistance improving agent to the polyamide resin has been attempted so far. Patent Document 1 discloses a polymer composition which contains a polyamide A which has a ratio of the terminal carboxyl group concentration to the amino terminal group concentration of 1 or more, a microtalcum in an amount of 0.001 to 1 wt % based on the total amount of the polymer composition, and an impact resistance improving agent in an amount of at least 1.0 wt % based on the total amount of the polymer composition. Patent Document 2 discloses a polyamide resin composition which contains a polyamide in an amount of 50 to 99 mass % and an acid-modified polyolefin which satisfies a predetermined condition in an amount of 1 to 50 mass %.

PRIOR ART DOCUMENTS

Patent Documents

Patent Document 1: JP 2013-532748 A
Patent Document 2: WO 2017/094720

SUMMARY OF THE INVENTION

Problem to be Solved by the Invention

However, the blend of the impact resistance improving agent to the polyamide resin as disclosed in Patent Document 1 results in significantly increase of the viscosity of the polyamide resin composition obtained by the chemical reaction between them. The rotational molded article obtained by rotational molding of such a polyamide resin composition has poor surface property such that a particulate tends to remain at the surface, which was not suitable for the application for rotational molding. In Patent Document 2, although the liquidity is improved by using a polyolefin having relatively lower viscosity as the acid-modified polyolefin, it has a problem that the impact resistance particularly at low temperature is decreased.

Accordingly, an object of the present invention is to provide a polyamide resin composition having excellent low-temperature impact resistance and surface property, a polyamide resin composition for rotational molding and a rotational molded article using the same.

Means of Solving the Problem

The present invention is a polyamide resin composition, comprising:

a component (A) in an amount of a parts by weight, which is an aliphatic polyamide having a relative viscosity $\eta r$ of less than 2.6 as measured according to JIS K6920 under the conditions of 96 wt % of sulfuric acid, 1 wt % of the polymer concentration, and 25° C.;

a component (B) in an amount of b parts by weight, which is a modified polyolefin having a density of 0.895 g/cm$^3$ or less as measured according to ASTM D1505; and a component (C) in an amount of c parts by weight, which is a non-modified polyolefin having an MFR value of 3.0 to 30 g/10 min as measured in a load of 2.16 kg at 190° C.;

wherein the polyamide resin composition satisfies the following equations:

$$50 \leq c/(b+c) \times 100 \leq 70, \text{ and}$$

$$10 \leq (b+c)/(a+b+c) \times 100 \leq 40;$$

and a polyamide resin composition for rotational molding and a rotational molded article using the same.

Effect of the Invention

According to the present invention, a polyamide resin composition having excellent low-temperature impact resistance and surface property, a polyamide resin composition for rotational molding and a rotational molded article using the same can be provided.

MODE FOR CARRYING OUT THE INVENTION

Component (A): aliphatic polyamide

The aliphatic polyamide used in the present invention has an amide bond (—CONH—) in the main chain, and is obtained by polymerizing or copolymerizing a lactam, an aminocarboxylic acid, or an aliphatic diamine and an aliphatic dicarboxylic acid as raw materials, which is an aliphatic polyamide structure unit, via a known method such as melt polymerization, solution polymerization, or solid phase polymerization.

Examples of the lactam include caprolactam, enantolactam, undecanelactam, dodecanelactam, α-pyrrolidone, and α-piperidone. Examples of the aminocarboxylic acid include 6-aminocaproic acid, 7-aminoheptanoic acid, 9-aminononanoic acid, 11-aminoundecanoic acid, and 12-aminododecanoic acid. One kind or two or more kinds of them may be used.

Examples of the aliphatic diamine include 1,2-ethanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 1,19-nonadecanediamine, 1,20-eicosanediamine, 2-methyl-1,5-pentanediamine, 3-methyl-1,5-pentanediamine, 2-methyl-1,8-octanediamine, 2,2,4-trimethyl-1,6-hexanediamine, 2,4,4-trimethyl-1,6-hexanediamine, and 5-methyl-1,9-nonanediamine. One kind or two or more kinds of them may be used.

Examples of the aliphatic dicarboxylic acid include oxalic acid, malonic acid, succinic acid, glutaric acid, adipic acid, pimelic acid, suberic acid, azelaic acid, sebacic acid, undecane diacid, dodecane diacid, tridecane diacid, tetradecane diacid, pentadecane diacid, hexadecane diacid, octadecane diacid, and eicosane diacid. One kind or two or more kinds of them may be used.

Examples of the aliphatic polyamide include homopolymers such as polycaprolactams (Polyamide 6), polyundecaneamide (Polyamide 11), polydodecaneamide (Polyamide 12), polyethylene adipamide (Polyamide 26), polytetramethylene succinamide (Polyamide 44), polytetramethylene glutamide (Polyamide 45), polytetramethylene adipamide (Polyamide 46), polytetramethylene suberamide (Polyamide 48), polytetramethylene azelamide (Polyamide 49), polytetramethylene sebacamide (Polyamide 410), polytetramethylene dodecamide (Polyamide 412), polypentamethylene succinamide (Polyamide 54), polypentamethylene glutamide (Polyamide 55), polypentamethylene adipamide (Polyamide 56), polypentamethylene suberamide (Polyamide 58), polypentamethylene azelamide (Polyamide 59), polypentamethylene sebacamide (Polyamide 510), polypentamethylene dodecamide (Polyamide 512), polyhexamethylene succinamide (Polyamide 64), polyhexamethylene glutamide (Polyamide 65), polyhexamethylene adipamide (Polyamide 66), polyhexamethylene suberamide (Polyamide 68), polyhexamethylene azelamide (Polyamide 69), polyhexamethylene sebacamide (Polyamide 610), polyhexamethylene dodecamide (Polyamide 612), polyhexamethylene tetradecamide (Polyamide 614), polyhexamethylene hexadecamide (Polyamide 616), polyhexamethylene octadecamide (Polyamide 618), polynonamethylene adipamide (Polyamide 96), polynonamethylene suberamide (Polyamide 98), polynonamethylene azelamide (Polyamide 99), polynonamethylene sebacamide (Polyamide 910), polynonamethylene dodecamide (Polyamide 912), polydecamethylene adipamide (Polyamide 106), polydecamethylene suberamide (Polyamide 108), polydecamethylene azelamide (Polyamide 109), polydecamethylene sebacamide (Polyamide 1010), polydecamethylene dodecamide (Polyamide 1012), polydodecamethylene adipamide (Polyamide 126), polydodecamethylene suberamide (Polyamide 128), polydodecamethylene azelamide (Polyamide 129), polydodecamethylene sebacamide (Polyamide 1210), and polydodecamethylene dodecamide (Polyamide 1212); and copolymers using several kinds of raw material monomers by which these are formed.

Among these, Polyamide 6 (homopolymer), or copolymers of the raw material monomer, by which Polyamide 6 is formed, and an additional raw material monomer is preferred in terms of the heat stability during molding and the molding processability. Polyamide 6 is more preferred.

Examples of the production apparatus for the aliphatic polyamide include known polyamide production apparatuses such as batch-type reaction tanks, one-part or multi-part continuous reaction apparatuses, tubular continuous reaction apparatuses, and kneading extruders including single-screw kneading extruders and twin-screw kneading extruders. As the polymerization method, a known method such as melt polymerization, solution polymerization, or solid phase polymerization can be used, and the operations at normal pressure, a reduced pressure, or an increased pressure can be repeated for the polymerization. These polymerization methods can be used alone, or can be suitably used in combination.

The aliphatic polyamide can be produced by polymerizing or copolymerizing an above-described raw material of the polyamide in the presence of an amine via a known method such as melt polymerization, solution polymerization, or solid phase polymerization. Alternatively, it can be produced by polymerizing a raw material, and then melt kneading them in the presence of an amine. Thus, the amine can be added at an arbitrary step during polymerization or at an arbitrary step during melt kneading after polymerization, but it is preferably added at a step during polymerization.

Examples of the amine include monoamines, diamines, triamines, and polyamines. Further, in addition to the amine, a carboxylic acid such as a monocarboxylic acid, a dicarboxylic acid, and a tricarboxylic acid can be added if needed, as long as it is not outside of the range of the requirement of the terminal group concentration described above. The amine and carboxylic acid may be added simultaneously, or may be added separately. Further, one kind or two or more kinds of amines and carboxylic acids exemplified below may be used.

Specific examples of the monoamine to be added include aliphatic monoamines such as methylamine, ethylamine, propylamine, butylamine, pentylamine, hexylamine, heptylamine, octylamine, 2-ethylhexylamine, nonylamine, decylamine, undecylamine, dodecylamine, tridecylamine, tetradecylamine, pentadecylamine, hexadecylamine, octadecylamine, octadecyleneamine, eicosylamine, and docosylamine; alicyclic monoamines such as cyclohexylamine, and methylcyclohexylamine; aromatic monoamines such as benzylamine, and β-phenylmethylamine; symmetrical secondary amines such as N,N-dimethylamine, N,N-diethylamine, N,N-dipropylamine, N,N-dibutylamine, N,N-dihexylamine, and N,N-dioctylamine; and asymmetrical secondary amines such as N-methyl-N-ethylamine, N-methyl-N-butylamine, N-methyl-N-dodecylamine, N-methyl-N-octadecylamine, N-ethyl-N-hexadecylamine, N-ethyl-N-octadecylamine, N-propyl-N-hexadecylamine, and N-propyl-N-benzylamine. One kind or two or more kinds of them may be used.

Specific examples of the diamine to be added include aliphatic diamines such as 1,2-ethanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 2-methyl-1,5-pentanediamine, 3-methyl-1,5-pentanediamine, 2-methyl-1,8-octanediamine, 2,2,4-trimethyl-1,6-hexanediamine, 2,4,4-trimethyl-1,6-hexanediamine, and 5-methyl-1,9-nonanediamine; alicyclic diamines such as 1,3-bis(aminomethyl)cyclohexane, 1,4-bis(aminomethyl)cyclohexane, bis(4-aminocyclohexyl)methane, 2,2-bis(4-aminocyclohexyl)propane, bis(3-methyl-4-aminocyclohexyl)methane, 2,2-bis(3-methyl-4-aminocyclohexyl)propane, 5-amino-2,2,4-trimethyl-1- cyclopentanemethylamine, 5-amino-1,3,3-trimethylcyclohexanemethylamine, bis(aminopropyl) piperazine, bis(aminoethyl)piperazine, 2,5-bis (aminomethyl)norbornane, 2,6-bis(aminomethyl) norbornane, 3,8-bis(aminomethyl)tricyclodecane, and 4,9-bis(aminomethyl)tricyclodecane; and aromatic diamines such m-xylylenediamine and p-xylylenediamine. One kind or two or more kinds of them may be used.

Specific examples of the triamine to be added include 1,2,3-triaminopropane, 1,2,3-triamino-2-methylpropane, 1,2,4-triaminobutane, 1,2,3,4-tetraminobutane, 1,3,5-triaminocyclohexane, 1,2,4-triaminocyclohexane, 1,2,3-triaminocyclohexane, 1,2,4,5-tetraminocyclohexane, 1,3,5-triaminobenzene, 1,2,4-triaminobenzene, 1,2,3-triaminobenzene, 1,2,4,5-tetraminobenzene, 1,2,4-triaminonaphthalene, 2,5,7-triaminonaphthalene, 2,4,6-triaminopyridine, 1,2,7,8-tetraminonaphthalene, and 1,4,5,8-tetraminonaphthalene. One kind or two or more kinds of them may be used.

The poly amine to be added should be a compound having a plurality of primary amino groups (—$NH_2$) and/or secondary amino groups (—NH—). Examples include polyalkylene imines, polyalkylene polyamines, polyvinylamines, and polyallylamines. The amino group containing an active hydrogen is a reaction point of the polyamine.

The polyalkylene imine can be produced by a method of ion-polymerizing an alkylene imine such as ethylene imine or propylene imine, or by a method of polymerizing an alkyloxazoline and by partially or totally hydrolyzing the polymer. Examples of the polyalkylene polyamine include, for example, diethylenetriamine, triethylenetetramine, pentaethylenehexamine, and reaction products of ethylenediamine with a multifunctional compound. The polyvinyl amine can be, for example, obtained by polymerizing N-vinylformamide to form a poly(N-vinylformamide), and then by partially or totally hydrolyzing the polymer with an acid such as hydrochloric acid. The polyallylamine can typically be obtained by polymerizing a hydrochloride salt of an allylamine monomer and by removing hydrochloric acid. One kind or two or more kinds of them may be used. Among these, the polyalkylene imines are preferred.

Examples of the polyalkylene imine include homopolymers and copolymers obtained by polymerizing one kind or two or more kinds of alkylene imines having a carbon atom number of 2 or more and 8 or less such as ethylene imine, propylene imine, 1,2-butylene imine, 2,3-butylene imine, and 1,1-dimethylethylene imine by a common method. Among these, the polyethylene imines are more preferred. The polyalkylene imine may be a branched polyalkylene imine containing a primary amine, a secondary amine, and a tertiary amine obtained by ring-opening polymerizing an alkylene imine as a raw material, or may be a linear polyalkylene imine containing only a primary amine and a secondary amine obtained by polymerizing an alkyloxazoline as a raw material, or may be a three-dimensionally crosslinked structure. Further, it may contain ethylenediamine, propylenediamine, diethylenetriamine, triethylenetetramine, tetraethylenepentamine, dipropylenetriamine, tripropylenetetramine, dihexamethylenetriamine, aminopropylethylenediamine, bisaminopropylethylenediamine, or the like. Typically, the polyalkylene imine has a primary amino group or a secondary amino group (an imino group) containing an active hydrogen atom in addition to a tertiary amine group, depending on the reactivity of the active hydrogen atom on a nitrogen atom contained in the polyalkylene imine.

The nitrogen atom number of the polyalkylene imine is not particularly limited, but it is preferably 4 or more and 3,000 or less, is more preferably 8 or more and 1,500 or less, and is further preferably 11 or more and 500 or less. Further, the number average molecular weight of the polyalkylene imine is preferably 100 or more and 20,000 or less, is more preferably 200 or more and 10,000 or less, and is further preferably 500 or more and 8,000 or less.

On the other hand, examples of the carboxylic acid to be added include aliphatic monocarboxylic acids such as acetic acid, propionic acid, butyric acid, valeric acid, caproic acid, enanthic acid, caprylic acid, capric acid, pelargonic acid, undecanoic acid, lauric acid, tridecanoic acid, myristic acid, myristoleic acid, palmitic acid, stearic acid, oleic acid, linoleic acid, arachic acid, behenic acid, and erucic acid; alicyclic monocarboxylic acids such as cyclohexane carboxylic acid and methyl cyclohexane carboxylic acid; aromatic monocarboxylic acids such as benzoic acid, toluic acid, ethylbenzoic acid, and phenylacetic acid; aliphatic dicarboxylic acids such as malonic acid, succinic acid, glutaric acid, adipic acid, pimelic acid, suberic acid, azelaic acid, sebacic acid, undecane diacid, dodecane diacid, hexadecane diacid, hexadecene diacid, octadecane diacid, octadecene diacid, eicosane diacid, eicocene diacid, docosane diacid, diglycolic acid, 2,2,4-trimethyladipic acid, and 2,4,4-trimethyladipic acid; alicyclic dicarboxylic acids such as 1,3-cyclohexanedicarboxylic acid, 1,4-cyclohexanedicarboxylic acid, and norbornanedicarboxylic acid; aromatic dicarboxylic acids such as terephthalic acid, isophthalic acid, phthalic acid, m-xylylenedicarboxylic acid, p-xylylenedicarboxylic acid, 1,4-naphthalenedicarboxylic acid, 2,6-naphthalenedicarboxylic acid, and 2,7-naphthalenedicarboxylic acid; and tricarboxylic acids such as 1,2,4-butanetricarboxylic acid, 1,3,5-pentanetricarboxylic acid, 1,2,6-hexanetricarboxylic acid, 1,3,6-hexanetricarboxylic acid, 1,3,5-cyclohexanetricarboxylic acid, and trimesic acid. One kind or two or more kinds of them may be used.

The aliphatic polyamide may be a mixture of two or more polyamides having a different terminal group concentration. In this case, the terminal amino group concentration and the terminal group carboxyl concentration of the polyamide mixture are determined by the terminal amino group concentration and the terminal carboxyl group concentration of each polyamide constituting the mixture, and the blending ratio.

In the present invention, it is important that the relative viscosity ηr of the aliphatic polyamide is less than 2.60 as measured according to JIS K6920 under the conditions of 96 wt % of sulfuric acid, 1 wt % of the polymer concentration, and 25° C. It can improve the liquidity of the polyamide resin composition obtained. When the aliphatic polyamide having a relative viscosity ηr of 2.60 or more is used, the liquidity of the obtained polyamide resin composition is decreased, and a particulate tends to remain at the surface of the rotational molded article using it. The relative viscosity ηr of the aliphatic polyamide is preferably 2.55 or less, is more preferably 2.45 or less, is further preferably 2.35 or less, and is particularly preferably 2.25 or less. For example, the relative viscosity ηr of the aliphatic polyamide may be 1.50 or more, or may be 2.00 or more.

Component (B): Modified polyolefin

Examples of the modified polyolefin used in the present invention include acid-modified polyolefins, epoxy-modified polyolefins, and glycidyl-modified polyolefins. Among these, acid-modified polyolefins are particularly preferred.

The acid-modified polyolefin is one obtained by acid-modifying a polyolefin with an unsaturated carboxylic acid or an acid anhydride thereof. Examples of the unsaturated carboxylic acid or the acid anhydride thereof include maleic acid, fumaric acid, itaconic acid, acrylic acid, methacrylic acid, cis-4-cyclohexen-1,2-dicarboxylic acid, maleic anhydride, itaconic anhydride, and cis-4-cyclohexen-1,2-dicarboxylic acid anhydride. Among these, maleic anhydride or itaconic anhydride is preferred, and maleic anhydride is more preferred. As a substitute for the unsaturated carboxylic acid or anhydride thereof, a derivative such as an acid amide and an acid ester may be used.

Examples of the pre-modified polyolefin include polyethylenes such as ethylene homopolymers and ethylene-α-olefin copolymers; and polypropylenes such as propylene homopolymers and propylene-α-olefin copolymers. Examples of the α-olefin constituting the ethylene-α-olefin copolymers or the propylene-α-olefin copolymer include α-olefins having a carbon atom number of 3 to 20, such as propylene, 1-butene, isobutylene, 1-pentene, 1-hexene, 1-heptene, 1-octene, 1-decene, 1-dodecene, 1-hexadecene, 1-octadecene, and 4-methyl-1-pentene. Among these, polyethylenes such as ethylene homopolymers and ethylene-α-olefin copolymers are preferred, and ethylene-α-olefin copolymers are more preferred. Ethylene-(1-butene) copolymers are is further preferred.

In the ethylene-α-olefin copolymer, the content of the ethylene unit is preferably more than 20 mol %. In the propylene-α-olefin copolymer, the content of the propylene unit is preferably more than 20 mol %. The ethylene-α-olefin copolymer may be a small amount of a diene component unit and/or a small amount of an aromatic component unit, in addition to the ethylene unit and the α-olefin component unit. The propylene-α-olefin copolymer may be a small amount of the diene component unit and/or a small amount of the aromatic component unit, in addition to the ethylene unit and the α-olefin component unit.

Examples of the diene component unit contained in the ethylene-α-olefin copolymer or the propylene-α-olefin copolymer include unconjugated diene components such as 1,4-hexadiene, dicyclopentadiene, 5-ethylidene-2-norbornene, and 2,5-norbornadiene; and conjugated diene components such as butadiene, isoprene, and piperylene. The content of the diene component unit in the ethylene-α-olefin copolymer or the propylene-α-olefin copolymer is preferably 20 mol % or less, and is more preferably 15 mol % or less.

Examples of the aromatic component unit contained in the ethylene-α-olefin copolymer or the propylene-α-olefin copolymer include styrene. Examples include aromatic vinyl compound copolymers and hydrogenated products thereof, and more specifically styrene/ethylene-butene/styrene block copolymers (SEBS), and styrene/ethylene-propylene/styrene block copolymers (SEPS). The content of the aromatic component unit in the ethylene-α-olefin copolymer or the propylene-α-olefin copolymer is preferably 40 wt % or less, is more preferably 20 wt % or less, and is further preferably 15 wt % or less.

In the present invention, it is important that the density of the acid-modified polyolefin is 0.895 g/cm$^3$ or less. It can improve the low-temperature impact resistance of the rotational molded article obtained. If the acid-modified polyolefin having a density of more than 0.895 g/cm$^3$ is used, the low-temperature impact resistance of the rotational molded article obtained is decreased. The density of the acid-modified polyolefin is preferably 0.885 g/cm$^3$ or less, is more preferably 0.880 g/cm$^3$ or less, and is further preferably 0.875 g/cm$^3$ or less. The density of the acid-modified polyolefin may be, for example, 0.845 g/cm$^3$ or more, or may be 0.855 g/cm$^3$ or more.

Component (C): Non-Modified polyolefin

Example of the non-modified polyolefin used in the present invention includes premodified polyolefins described in the above-described chapter "<Component (B): modified polyolefin>". Among these, polyethylenes such as ethylene homopolymers and ethylene-α-olefin copolymers are preferred. Ethylene-homopolymers are more preferred. Examples of the polyethylene include high density polyethylenes (HDPE), middle density polyethylenes (MDPE), low density polyethylenes (LDPE), and linear low density polyethylenes (LLDPE).

In the present invention, it is important that the MFR value of the non-modified polyolefin is from 3.0 to 30 g/10 min as measured in a load of 2.16 kg and 190° C. It can provide both the surface property and the low-temperature impact resistance of the rotational molded article obtained. If the non-modified polyolefin having an MFR value of less than 3.0 g/10 min is used, the liquidity of the polyamide resin composition is decreased, and a particulate tends to remain at the surface of the rotational molded article obtained using it. If the non-modified polyolefin having an MFR value of more than 3.0 g/10 min is used, the surface property of the rotational molded article obtained is impaired because of the phase separated non-modified polyolefin. In addition, a core-shell structure can not be formed, and therefore the low-temperature impact resistance is decreased. The MFR value of the non-modified polyolefin is preferably 3.3 g/10 min or more, and is more preferably 3.6 g/10 min or more. The MFR value of the non-modified polyolefin is preferably 20 g/10 min or less, is more preferably 15 g/10 min or less, is further preferably 10 g/10 min or less, and is particularly preferably 5 g/10 min or less.

In the present invention, the density of the non-modified polyolefin is preferably 0.890 g/cm$^3$ or more as measured according to ASTM D1505. It can maintain the stiffness of the obtained rotational molded article. If the non-modified polyolefin having a density of less than 0.890 g/cm$^3$, the stiffness of the obtained rotational molded article may be decreased. The density of the non-modified polyolefin is more preferably 0.895 g/cm$^3$ or more, and is particularly preferably 0.900 g/cm$^3$ or more. For example, the density of the non-modified polyolefin may be, for example, 1.00 g/cm$^3$ or less, or may be 0.950 g/cm$^3$ or less.

Component (D): Semi-Aromatic polyamide

The semi-aromatic polyamide resin which is preferably used in the present invention is a copolymer of an aromatic dicarboxylic acid and an aliphatic diamine, or a copolymer of an aliphatic dicarboxylic acid and an aromatic diamine. Using the semi-aromatic polyamide resin improves the heat resistance and the low-temperature impact resistance. Among these, preferred is a copolymer which has a diamine unit containing 50 mol % or more of an aliphatic diamine unit having a carbon atom number of 6 or more and 13 or less based on the total diamine units and a dicarboxylic acid unit containing 50 mol % or more of terephthalic acid unit, isophthalic acid unit and/or a naphthalenedicarboxylic acid unit based on the total dicarboxylic acid units; or a copolymer which has a diamine unit containing 50 mol % or more of a xylylenediamine unit and/or a bis(aminomethyl)naphthalene unit based on the total diamine units, and a dicarboxylic acid unit containing 50 mol % or more of an aliphatic dicarboxylic acid unit having a carbon atom number of 6 or more and 13 or less based on the total dicarboxylic acid units.

The semi-aromatic polyamide which has terephthalic acid unit, isophthalic acid unit and/or a naphthalenedicarboxylic acid unit will now be described.

The content of the aliphatic diamine unit having a carbon atom number of 6 or more and 13 or less in the semi-aromatic polyamide is 50 mol % or more, is preferably 55 mol % or more, and is more preferably 60 mol % or more, based on the total diamine units in terms of sufficiently securing various properties of the polyamide resin composition obtained.

Examples of the aliphatic diamine unit having a carbon atom number of 6 or more and 13 or less include units derived from 1,6-hexanediamine, 1,7-heptanediamine, 1,8-octanediamine, 1,9-nonanediamine, 1,10-decanediamine, 1,11-undecanediamine, 1,12-dodecanediamine, and 1,13-tridecanediamine. As long as the carbon atom number is satisfied as described above, it may contain a unit derived from a branched chain aliphatic diamine such as 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, 2,2,4-trimethyl-1,6-hexanediamine, 2,4,4-trimethyl-1,6-hexanediamine, 2,4-diethyl-1,6-hexanediamine, 2,2-dimethyl-heptanediamine, 2,3-dimethyl-heptanediamine, 2,4-dimethyl-heptanediamine, 2,5-dimethyl-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,2-dimethyl-1,8-octanediamine, 2,4-dimethyl-1,8-octanediamine, 3,3-dimethyl-1,8-octanediamine, 3,4-dimethyl-1,8-octanediamine, 4,4-dimethyl-1,8-octanediamine, 4,5-dimethyl-1,8-octanediamine, 5-methyl-1,9-nonanediamine, 2-butyl-1,8-octanediamine, or 3-butyl-1,8-octanediamine. One kind or two or more kinds of them may be used.

Among the above-described aliphatic diamine units having a carbon atom number of 6 or more and 13 or less, a unit derived from 1,6-hexanediamine, 1,7-heptanediamine, 1,8-octanediamine, 1,9-nonanediamine, 2-methyl-1,8-octanediamine, or 1,10-decanediamine is preferred, in terms of the heat resistance of the obtained rotational molded article. A unit derived from 1,6-hexadiamine is preferred.

The diamine unit in the semi-aromatic polyamide may contain an additional diamine unit other than the aliphatic diamine unit having a carbon atom number of 6 or more and 13 or less as long as various excellent properties of the polyamide resin composition of the present invention are not impaired. Examples of the additional diamine unit include units derived from an aliphatic diamine such as 1,2-ethanediamine, 1,3-propanediamine, 1,4-butanediamine, or 1,5-pentanediamine; units derived from an alicyclic diamine such as 1,3-cyclohexanediamine, 1,4-cyclohexanediamine, 1,3-bis(aminomethyl)cyclohexane, 1,4-bis(aminomethyl)cyclohexane, bis(4-aminocyclohexyl)methane, 2,2-bis(4-aminocyclohexyl)propane, bis(3-methyl-4-aminocyclohexyl)methane, 2,2-bis(3-methyl-4-aminocyclohexyl)propane, 5-amino-2,2,4-trimethyl-1-cyclopentanemethylamine, 5-amino-1,3,3-trimethylcyclohexanemethylamine, bis(aminopropyl)piperazine, bis(aminoethyl)piperazine, 2,5-bis(aminomethyl)norbornane, 2,6-bis(aminomethyl)norbornane, 3,8-bis(aminomethyl)tricyclodecane, or 4,9-bis(aminomethyl)tricyclodecane; and units derived from an aromatic diamine such as m-phenylenediamine, p-phenylenediamine, m-xylylenediamine, p-xylylenediamine, 1,4-bis(aminomethyl)naphthalene, 1,5-bis(aminomethyl)naphthalene, 2,6-bis(aminomethyl)naphthalene, 2,7-bis(aminomethyl)naphthalene, 4,4'-diaminodiphenylmethane, 2,2-bis(4-aminophenyl)propane, 4,4'-diaminodiphenylsulfone, or 4,4'-diaminodiphenyl ether. One kind or two or more kinds of them may be used. The content of the additional diamine unit is 50 mol % or less, is preferably 45 mol % or less, and is more preferably 40 mol % or less, based on the total diamine units.

Further, the content of the terephthalic acid unit, the isophthalic acid unit and/or the naphthalenedicarboxylic acid unit in the semi-aromatic polyamide is 50 mol % or more, is preferably 55 mol % or more, and is more preferably 60 mol % or more, based on the total dicarboxylic acid units in terms of sufficiently securing various properties of the polyamide resin composition obtained.

Examples of the naphthalenedicarboxylic acid unit include units derived from 2,6-naphthalenedicarboxylic acid, 2,7-naphthalenedicarboxylic acid, 1,4-naphthalenedicarboxylic acid, or 1,5-naphthalenedicarboxylic acid. One kind or two or more kinds of them may be used. Among the naphthalenedicarboxylic acid units, considering the economic efficiency and the availability, a unit derived from 2,6-naphthalenedicarboxylic acid or 2,7-naphthalenedicarboxylic acid is preferred.

The dicarboxylic acid unit in the semi-aromatic polyamide may contain an additional dicarboxylic acid unit other than terephthalic acid unit, isophthalic acid unit and/or a naphthalenedicarboxylic acid unit as long as various excellent properties of the polyamide resin composition of the present invention are not impaired. Examples of the additional dicarboxylic acid unit include units derived from an aliphatic dicarboxylic acid such as malonic acid, dimethylmalonic acid, succinic acid, glutaric acid, adipic acid, 2-methyladipic acid, pimelic acid, 2,2-dimethylglutaric acid, 2,2-diethylsuccinic acid, suberic acid, azelaic acid, 2,2,4-trimethyladipic acid, 2,4,4-trimethyladipic acid, sebacic acid, undecane diacid, dodecane diacid, tridecane diacid, tetradecane diacid, pentadecane diacid, hexadecane diacid, octadecane diacid, or eicosane diacid; units derived from an alicyclic dicarboxylic acid such as 1,3-cyclopentanedicarboxylic acid, 1,3-cyclohexanedicarboxylic acid, or 1,4-cyclohexanedicarboxylic acid; and units derived from an aromatic dicarboxylic acid such as phthalic acid, 1,3-phenylenedioxy diacetic acid, 1,4-phenylenedioxy diacetic acid, 4,4'-oxydibenzoic acid, diphenylmethane-4,4'-dicarboxylic acid, diphenylethane-4,4'-dicarboxylic acid, diphenylpropane-4,4'-dicarboxylic acid, diphenylether-4,4'-dicarboxylic acid, diphenylsulfone-4,4'-dicarboxylic acid, 4,4'-biphenyldicarboxylic acid, or 4,4'-triphenyldicarboxylic acid. One kind or two or more kinds of them may be used. Among these units, units derived from the aromatic dicarboxylic acid is preferred. The content of the additional dicarboxylic acid unit is 50 mol % or less, is preferably 45 mol % or less, and is more preferably 40 mol % or less, based on the total dicarboxylic acid units. Further, a multivalent carboxylic acid such as trimellitic acid, trimesic acid, or pyromellitic acid can be used within a range being capable of performing melt molding.

The semi-aromatic polyamide may contain an additional unit other than the dicarboxylic acid unit and the diamine unit as long as various excellent properties of the polyamide resin composition of the present invention are not impaired. Examples of the additional unit include units derived from a lactam such as caprolactam, enantholactam, undecanelactam, dodecanelactam, α-pyrrolidone, or α-piperidone; and units derived from an aminocarboxylic acid, including an aliphatic aminocarboxylic acid such as 6-aminocaproic acid, 7-aminoheptanoic acid, 9-aminononanoic acid, 11-aminoundecanoic acid, or 12-aminododecane, and an aromatic aminocarboxylic acid such as p-aminomethylbenzoic acid. One kind or two or more kinds of them may be used. The content of the additional unit is preferably 45 mol % or less, is more preferably 40 mol % or less, and is further preferably 35 mol % or less, based on the total dicarboxylic acid units.

Specific examples of the semi-aromatic polyamide include homopolymers such as polyhexamethylene terephthalamide (Polyamide 6T), polyhexamethylene isophthalamide (Polyamide 6I), polyhexamethylene naphthalamide (Polyamide 6N), polynonamethylene terephthalamide (Polyamide 9T), polynonamethylene isophthalamide (Polyamide 9I), polynonamethylene naphthalamide (Polyamide 9N), poly(2-methyloctamethylene terephthalamide) (Polyamide M8T), poly(2-methyloctamethylene isophthalamide) (Polyamide M8I), poly(2-methyloctamethylene naphthalamide) (Polyamide M8N), polytrimethylhexamethylene terephthalamide (Polyamide TMHT), polytrimethylhexamethylene isophthalamide (Polyamide TMHI), polytrimethylhexamethylene naphthalamide (Polyamide TMHN), polydecamethylene terephthalamide (Polyamide 10T), polydecamethylene isophthalamide (Polyamide 10I), polydecamethylene naphthalamide (Polyamide 10N), polyundecamethylene terephthalamide (Polyamide 11T), polyundecamethylene isophthalamide (Polyamide 11I), polyundecamethylene naphthalamide (Polyamide 11N), polydodecamethylene terephthalamide (Polyamide 12T), polydodecamethylene isophthalamide (Polyamide 12I), and polydodecamethylene naphthalamide (Polyamide 12N); and/or copolymers using a raw material monomer of these polyamides and/or several kinds of raw material monomers of the above-described polyamide (A). One kind or two or more kinds of them may be used.

Among these, in terms of sufficiently securing the availability and various properties including the heat resistance and the low-temperature impact resistance, preferred examples of the semi-aromatic polyamide include poly(hexamethylene terephthalamide/hexamethylene isophthalamide) copolymer (Polyamide 6T/6I), poly(hexamethylene terephthalamide/hexamethylene adipamide) copolymer (Polyamide 6T/66), poly(hexamethylene terephthalamide/hexamethylene sebacamide) copolymer (Polyamide 6T/610), poly(hexamethylene terephthalamide/hexamethylene dodecamide) copolymer (Polyamide 6T/612), poly(hexamethylene terephthalamide/hexamethylene isophthalamide/hexamethylene adipamide) copolymer (Polyamide 6T/6I/66), poly(hexamethylene terephthalamide/2-methylpentamethylene terephthalamide) copolymer (Polyamide 6T/M5T), poly(hexamethylene terephthalamide/caproamide) copolymer (Polyamide 6T/6). More preferred examples include poly(hexamethylene terephthalamide/hexamethylene isophthalamide) copolymer (Polyamide 6T/6I), poly(hexamethylene terephthalamide/hexamethylene isophthalamide/hexamethylene adipamide) copolymer (Polyamide 6T/6I/66), and mixtures thereof.

Examples of the production apparatus for the semi-aromatic polyamide include known polyamide production apparatuses such as batch-type reaction tanks, one-part or multi-part continuous reaction apparatuses, tubular continuous reaction apparatuses, kneading extruders including single-screw kneading extruders and twin-screw kneading extruders. As the polymerization method, a known method such as melt polymerization, solution polymerization, or solid phase polymerization can be used, and the operations at normal pressure, a reduced pressure, or an increased pressure can be repeated for the polymerization. These polymerization methods can be used alone, or can be suitably used in combination.

When the semi-aromatic polyamide is produced, phosphoric acid, phosphorous acid, phosphinic acid, or a salt or an ester thereof may be added as a catalyst. Examples of the salt or the ester of phosphoric acid, phosphorous acid, or phosphinic acid include, for example, a metal salt of phosphoric acid, phosphorous acid, or phosphinic acid with potassium, sodium, magnesium, vanadium, calcium, zinc, cobalt, manganese, tin, tungsten, germanium, titanium, antimony, or the like; ammonium salts of phosphoric acid, phosphorous acid, or phosphinic acid; and ethyl esters, isopropyl esters, butyl esters, hexyl esters, isodesyl esters, desyl esters, stearyl esters, and phenyl esters of phosphoric acid, phosphorous acid, or phosphinic acid. One kind or two or more kinds of them may be used.

The semi-aromatic polyamide which has a xylylenediamine unit and/or a bis(aminomethyl)naphthalene unit will now be described.

The content of the xylylenediamine unit and/or the bis(aminomethyl)naphthalene unit in the semi-aromatic polyamide is 50 mol % or more, is preferably 60 mol % or less, and is more preferably 70 mol % or less, based on the total diamine units in terms of sufficiently securing various properties of the obtained polyamide resin composition.

Examples of the xylylenediamine unit include units derived from o-xylylene diamine, m-xylylene diamine, or p-xylylene diamine. One kind or two or more kinds of them may be used. Among these xylylene diamine units, a unit derived from m-xylylene diamine or p-xylylene diamine is preferred.

Examples of the bis(aminomethyl)naphthalene unit include units derived from 1,4-bis(aminomethyl)naphthalene, 1,5-bis(aminomethyl)naphthalene, 2,6-bis(aminomethyl)naphthalene, or 2,7-bis(aminomethyl)naphthalene. One kind or two or more kinds of them may be used. Among these bis(aminomethyl)naphthalene units, a unit derived from 1,5-bis(aminomethyl)naphthalene or 2,6-bis(aminomethyl)naphthalene is preferred.

The diamine unit in the semi-aromatic polyamide may contain an additional diamine unit other than the xylylenediamine unit and/or the bis(aminomethyl)naphthalene unit as long as various excellent properties of the polyamide resin composition of the present invention are not impaired. Examples of the additional diamine unit include units derived from an aliphatic diamine such as 1,2-ethanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 1,19-nonadecanediamine, 1,20-eicosanediamine, 2-methyl-1,5-pentanediamine, 3-methyl-1,5-pentanediamine, 2-methyl-1,8-octanediamine, 2,2,4-trimethyl-1,6-hexanediamine, 2,4,4-trimethyl-1,6-hexanediamine, or 5-methyl-1,9-nonanediamine; units derived from an alicyclic diamine such as 1,3-cyclohexanediamine, 1,4-cyclohexanediamine, 1,3-bis(aminomethyl)cyclohexane, 1,4-bis(aminomethyl)cyclohexane, bis(4-aminocyclohexyl)methane, 2,2-bis(4-aminocyclohexyl)propane, bis(3-methyl-4-aminocyclohexyl)methane, 2,2-bis(3-methyl-4-aminocyclohexyl)propane, 5-amino-2,2,4-trimethyl-1-cyclopentanemethylamine, 5-amino-1,3,3-trimethylcyclohexanemethylamine, bis(aminopropyl)piperazine, bis(aminoethyl)piperazine, 2,5-bis(aminomethyl)norbornane, 2,6-bis(aminomethyl)norbornane, 3,8-bis(aminomethyl)tricyclodecane, or 4,9-bis(aminomethyl)tricyclodecane; and units derived from an aromatic diamine such as m-phenylenediamine, p-phenylenediamine, 4,4'-diaminodiphenylmethane, 2,2-bis(4-aminophenyl)propane, 4,4'-diaminodiphenylsulfone, or 4,4'-diaminodiphenyl ether. One kind or two or more kinds of them may be used. The content of the additional diamine unit is 50 mol % or less, is preferably 40 mol % or less, and is more preferably 30 mol % or less, based on the total diamine units.

The content of the aliphatic dicarboxylic acid unit having a carbon atom number of 6 or more and 13 or less in the semi-aromatic polyamide is 50 mol % or more, is preferably 60 mol % or more, and is more preferably 70 mol % or more, based on the total dicarboxylic acid units in terms of sufficiently securing various properties of the obtained polyamide resin composition.

Examples of the aliphatic dicarboxylic acid unit having a carbon atom number of 6 or more and 13 or less include units derived from adipic acid, pimelic acid, suberic acid, azelaic acid, sebacic acid, undecane diacid, dodecane diacid, tridecane diacid, or the like. As long as the carbon atom number is satisfied as described above, a unit derived from a branched chain aliphatic dicarboxylic acid such as methylethylmalonic acid, 2,2-dimethylsuccinic acid, 2,3-dimethylsuccinic acid, 2-methylglutaric acid, 3-methylglutaric acid, 2-methyladipic acid, 2,2-dimethylglutaric acid, 2,2-diethylsuccinic acid, 2,2,4-trimethyladipic acid, 2,4,4-trimethyladipic acid, or 2-butylsuberic acid may be contained. One kind or two or more kinds of them may be used. Among the aliphatic dicarboxylic acid units having a carbon atom number of 6 or more and 13 or less, in terms of a balance of the heat resistance of the obtained rotational molded article, a unit derived from adipic acid, pimelic acid, suberic acid, azelaic acid, sebacic acid, undecane diacid, or dodecane diacid is preferred, and in terms of the sufficiently securing the low-temperature impact resistance, a unit derived from adipic acid is preferred.

The dicarboxylic acid unit in the semi-aromatic polyamide may contain an additional dicarboxylic acid unit other than the aliphatic dicarboxylic acid unit having a carbon atom number of 6 or more and 13 or less as long as various excellent properties of the polyamide resin composition of the present invention are not impaired. Examples of the additional dicarboxylic acid unit include units derived from an aliphatic dicarboxylic acid such as malonic acid, dimethylmalonic acid, succinic acid, glutaric acid, 2-methyladipic acid, tetradecane diacid, pentadecane diacid, hexadecane diacid, octadecane diacid, or eicosane diacid; units derived from an alicyclic dicarboxylic acid unit such as 1,3-cyclopentanedicarboxylic acid, 1,3-cyclohexanedicarboxylic acid, or 1,4-cyclohexanedicarboxylic acid; and units derived from an aromatic dicarboxylic acid such as terephthalic acid, isophthalic acid, 1,4-naphthalenedicarboxylic acid, 1,5-naphthalenedicarboxylic acid, 2,6-naphthalenedicarboxylic acid, 2,7-naphthalenedicarboxylic acid, 1,3-phenylenedioxy diacetic acid, 1,4-phenylenedioxy diacetic acid, 4,4'-oxydibenzoic acid, diphenylmethane-4,4'-dicarboxylic acid, diphenylethane-4,4'-dicarboxylic acid, diphenylpropane-4,4'-dicarboxylic acid, diphenylether-4,4'-dicarboxylic acid, biphenylsulfone-4,4'-dicarboxylic acid, 4,4'-biphenyldicarboxylic acid, or 4,4'-triphenyldicarboxylic acid. One kind or two or more kinds of them may be used. Among these units, a unit derived from an aromatic dicarboxylic acid is preferred. The content of the additional dicarboxylic acid unit is 50 mol % or less, is preferably 40 mol % or less, and is more preferably 30 mol % or less, based on the total dicarboxylic acid units. Further, a multivalent carboxylic acid such as trimellitic acid, trimesic acid, or pyromellitic acid can be used within a range being capable of performing melt molding.

The semi-aromatic polyamide may contain an additional unit other than the dicarboxylic acid unit and the diamine unit as long as various excellent properties of the polyamide resin composition of the present invention are not impaired. Examples of the additional unit include units derived from a lactam such as caprolactam, enantholactam, undecanelactam, dodecanelactam, α-pyrrolidone, or α-piperidone; and units derived from an aminocarboxylic acid, including an aliphatic aminocarboxylic acid such as 6-aminocaproic acid, 7-aminoheptanoic acid, 9-aminononanoic acid, 11-aminoundecanoic acid, or 12-aminododecane, and an aromatic aminocarboxylic acid such as p-aminomethylbenzoic acid. One kind or two or more kinds of them may be used. The content of the additional unit is preferably 30 mol % or less, and is more preferably 10 mol % or less, based on the total dicarboxylic acid units.

Specific examples of the semi-aromatic polyamide include homopolymer such as polymetaxylylene adipamide (Polyamide MXD6), polymetaxylylene suberamide (Polyamide MXD8), polymetaxylylene azelamide (Polyamide MXD9), polymetaxylylene sebacamide (Polyamide MXD10), polymetaxylylene dodecamide (Polyamide MXD12), polyparaxylylene adipamide (Polyamide PXD6), polyparaxylylene suberamide (Polyamide PXD8), polyparaxylyleneazelamide (Polyamide PXD9), polyparaxylylenesebacamide (Polyamide PXD10), polyparaxylylenedodecamide (Polyamide PXD12), poly(2,6-naphthalene dimethylene adipamide) (Polyamide 2,6-BAN6), poly(2,6-naphthalene dimethylene suberamide) (Polyamide 2,6-BAN8), poly(2,6-naphthalene dimethylene azelamide) (Polyamide 2,6-BAN9), poly(2,6-naphthalene dimethylene sebacamide) (Polyamide 2,6-BAN10), and poly(2,6-naphthalene dimethylene dodecamide) (Polyamide 2,6-BAN12), and/or copolymers using several kinds of the raw material monomers of these polyamides; and/or copolymers using several kinds of the raw material monomers for forming polymetaxylylene terephthalamide (Polyamide MXDT), polymetaxylylene isophthalamide (Polyamide MXDI), polymetaxylylene naphthalamide (Polyamide MXDN), polyparaxylylene terephthalamide (Polyamide PXDT), polyparaxylylene isophthalamide (Polyamide PXDI), polyparaxylylenenaphthalamide (Polyamide PXDN), poly(2,6-naphthalene dimethylene terephthalamide) (Polyamide 2,6-BANT), poly(2,6-naphthalene dimethylene isophthalamide) (Polyamide 2,6-BANI), or poly(2,6-naphthalene dimethylene naphthalamide) (Polyamide 2,6-BANN). One kind or two or more kinds of them may be used.

Among these, in terms of sufficiently securing various properties such as the heat resistance or the low-temperature impact resistance, more preferred examples of the semi-aromatic polyamide include polymetaxylylene adipamide (Polyamide MXD6), polyparaxylylene adipamide (Polyamide PXD6), poly(metaxylylene adipamide/metaxylylene terephthalamide) copolymer (Polyamide MXD6/MXDT), poly(metaxylylene adipamide/metaxylylene isophthalamide) copolymer (Polyamide MXD6/MXDI), poly(metaxylylene adipamide/metaxylylene terephthalamide/metaxylylene isophthalamide) copolymer (Polyamide MXD6/MXDT/MXDI), poly(paraxylylene adipamide/paraxylylene terephthalamide) copolymer (Polyamide PXD6/PXDT), poly(paraxylylene adipamide/paraxylylene isophthalamide) copolymer (Polyamide PXD6/PXDI), poly(paraxylylene adipamide/paraxylylene terephthalamide/paraxylylene isophthalamide) copolymer (Polyamide PXD6/PXDT/PXDI), poly(metaxylylene adipamide/paraxylylene adipamide) copolymer (Polyamide MXD6/PXD6), poly(metaxylylene adipamide/paraxylylene adipamide/metaxylylene terephthalamide/paraxylylene terephthalamide) copolymer (Polyamide MXD6/PXD6/MXDT/PXDT), poly(metaxylylene adipamide/paraxylylene adipamide/metaxylylene isophthalamide/paraxylylene isophthalamide) copolymer (Polyamide MXD6/PXD6/MXDI/PXDI), poly(metaxylylene adipamide/paraxylylene adipamide/metaxylylene terephthalamide/paraxylylene terephthalamide/metaxylylene isophthalamide/paraxylylene isophthalamide) copolymer (Polyamide MXD6/PXD6/MXDT/PXDT/MXDI/PXDI), and mixtures thereof.

A phosphorous compound can be added to the semi-aromatic polyamide for improving the stability during rotational molding or for preventing coloring. Examples of the phosphorous compound include alkaline earth metal salts of hypophosphoric acid, alkali metal salts of phosphorous acid, alkaline earth metal salts of phosphorous acid, alkali metal salts of phosphoric acid, alkaline earth metal salts of phosphoric acid, alkali metal salts of pyrophosphoric acid, alkaline earth metal salts of pyrophosphoric acids, alkali metal salts of metaphosphoric acid, and alkaline earth metal salts of metaphosphoric acid.

Specific examples include calcium hypophosphite, magnesium hypophosphite, sodium phosphite, sodium hydrogen phosphite, potassium phosphite, potassium hydrogen phosphite, lithium phosphite, lithium hydrogen phosphite, magnesium phosphite, magnesium hydrogen phosphite, calcium phosphite, calcium hydrogen phosphite, sodium phosphate, disodium hydrogen phosphate, sodium dihydrogen phosphate, potassium phosphate, dipotassium hydrogen phosphate, potassium dihydrogen phosphate, magnesium phosphate, dimagnesium hydrogen phosphate, magnesium dihydrogen phosphate, calcium phospate, dicalcium hydrogen phosphate, calcium dihydrogen phosphate, lithium phospate, dilithium hydrogen phosphate, lithium dihydrogen phosphate, sodium pyrophosphate, potassium pyrophosphate, magnesium pyrophosphate, calcium pyrophosphate, lithium pyrophosphate, sodium metaphosphate, potassium metaphosphate, magnesium metaphosphate, calcium metaphosphate, and lithium metaphosphate. One kind or two or more kinds of them may be used. Among these, calcium hypophosphite, magnesium hypophosphite, calcium phosphite, calcium hydrogen phosphite, and calcium dihydrogen phosphate are preferred. Calcium hypophosphite is more preferred. Note that the phosphorous compound may be a hydrate.

The content of the phosphorous compound is preferably 0.03 parts by mass or more and 0.30 parts by mass or less, is more preferably 0.05 parts by mass or more and 0.20 parts by mass or less, and is further preferably 0.07 parts by mass or more and 0.15 parts by mass or less, based on 100 parts by mass of the semi-aromatic polyamide on the basis of the phosphorous atom concentration, in terms of sufficiently securing the coloring preventing effect and preventing gellation.

Examples of the method of adding the phosphorous compound include methods by adding it to an aqueous nylon salt solution, a diamine, or a dicarboxylic acid which is a raw material of the semi-aromatic polyamide; methods by adding it to a dicarboxylic acid in a melted form; and methods by adding it during melt polymerization. However, any method can be used as long as it can be homogenously dispersed in the semi-aromatic polyamide, and the method is not limited to these methods.

An alkali metal compound may be added to the semi-aromatic polyamide, in addition to the phosphorous compound. The sufficient amount of the phosphorous compound is required to be present in order to prevent the coloration of the polyamide during polycondensation. However, since it may result in the gellation of the polyamide, an alkali metal compound is also preferably present for adjusting the reaction rate of the amidation. Examples of the alkali metal compound include hydroxides of an alkali metal, hydroxides of an alkaline earth metal, acetate salts of an alkali metal, and acetate salts of an alkaline earth metal. Hydroxides of an alkali metal or acetate salts of the alkali metal are preferred.

Specific examples of the alkali metal compound include lithium hydroxide, sodium hydroxide, potassium hydroxide, rubidium hydroxide, cesium hydroxide, magnesium hydroxide, calcium hydroxide, strontium hydroxide, barium hydroxide, lithium acetate, sodium acetate, potassium acetate, rubidium acetate, cesium acetate, magnesium acetate, calcium acetate, strontium acetate, and barium acetate. One kind or two or more kinds of them may be used. Among these, in terms of the economic efficiency, sodium hydroxide, potassium hydroxide, magnesium hydroxide, calcium hydroxide, sodium acetate, and potassium acetate are preferred, and sodium hydroxide, sodium acetate, and potassium acetate are preferred.

When the alkali metal compound is added to a polycondensation system of the semi-aromatic polyamide, a value obtained by dividing the moles of the compound by the moles of the phosphorous compound on the basis of phosphorous atoms is preferably 0.3 or more and 1.0 or less, is more preferably 0.40 or more and 0.95 or less, and is further preferably 0.5 or more and 0.9 or less, in terms of a balance of promoting and preventing the amidation reaction.

Examples of the method of adding the alkali metal compound include methods by adding it to an aqueous nylon salt solution, a diamine, or a dicarboxylic acid which is a raw material of the semi-aromatic polyamide (D), methods by adding it to a dicarboxylic acid in a melted form; and methods of adding it during melt polymerization. However, any method can be used as long as it can be homogenously dispersed in the semi-aromatic polyamide (D), and the method is not limited to these methods.

Examples of the production apparatus for the semi-aromatic polyamide include known polyamide production apparatuses such as batch-type reaction tanks, one-part or multi-part continuous reaction apparatuses, tubular continuous reaction apparatuses, and kneading extruder including single-screw kneading extruders and twin-screw kneading extruders. Examples of the production method of the semi-aromatic polyamide include known methods such as melt polymerization, solution polymerization and solid phase polymerization. Using the method, the operations at normal pressure, a reduced pressure and an increased pressure can be repeated to produce the semi-aromatic polyamide. These polymerization methods can be used alone, or can be suitably used in combination. Among these, melt polymerization is preferred. For example, it is produced by a method by pressuring and heating a nylon salt being composed of xylylenediamine and/or bis(aminomethyl)naphthalene and an aliphatic dicarboxylic acid having a carbon atom number of 8 or more and 13 or less in the presence of water, and by polymerizing it in a melted form while removing the water added and the water condensed. It is also produced by a method by directly adding xylylenediamine and/or bis(aminomethyl)naphthalene to an aliphatic dicarboxylic acid having a carbon atom number of 8 or more and 13 or less in a melted form, and by condensation polymerizing it at normal pressure. In this case, the polymerization is performed by continuously adding xylylenediamine and/or bis(aminomethyl)naphthalene to the aliphatic dicarboxylic acid having a carbon atom number of 8 or more and 13 or less in order to keep the reaction system in a homogeneous liquid phase while increasing the temperature of the reaction system so that the temperature is not lower than the melting point of the resulting oligoamide and the polyamide. Alternatively, after the semi-aromatic polyamide is produced by melt polymerization, a solid phase polymerization may be performed.

Hereinafter, the semi-aromatic polyamide which contains terephthalic acid unit and/or naphthalenedicarboxylic acid unit as well as the semi-aromatic polyamide which contains xylylenediamine unit and/or bis(aminomethyl)naphthalene unit will now be described.

The relative viscosity of the semi-aromatic polyamide (D), as measured according to JIS K6920 under the conditions of 96 wt % of sulfuric acid, 1 wt % of the polymer concentration, and 25° C., is preferably from 1.0 or more and 5.0 or less in terms of securing the mechanical property of the obtained polyamide resin composition, and securing of the desired processability of the polyamide resin composition by adjusting the viscosity in a melted form to a suitable range. In particular, lower relative viscosity is preferred.

Note that the kind of the terminal group in the semi-aromatic polyamide, the concentration, and the molecular distribution are not particularly limited. In order to adjust the molecular weight and stabilize melting during molding processing, one kind of or two or more kinds in combination of monoamines, diamines, polyamines, monocarboxylic acids, and dicarboxylic acids can be suitably added. Examples include aliphatic monoamines such as methylamine, ethylamine, propylamine, butylamine, hexylamine, octylamine, decylamine, stearylamine, dimethylamine, diethylamine, dipropylamine, and dibutylamine; alicyclic monoamines such as cyclohexylamine and dicyclohexylamine; aromatic monoamines such as aniline, toluidine, diphenylamine, and naphthylamine; aliphatic diamines such as 1,4-butanediamine, 1,5-pentanediamine, 1,6-hexanediamine, 1,8-octanediamine, and 2-methyl-1,5-pentanediamine; alicyclic diamines such as cyclohexanediamine, bis (aminomethyl)cyclohexane, and 5-amino-1,3,3-trimethylcyclohexanemethylamine; aromatic diamines such as m-phenylenediamine and p-phenylenediamine; polyamines such as polyalkyleneimine, polyalkylenepolyamine, polyvinylamine, and polyallylamine; aliphatic monocarboxylic acids such as acetic acid, propionic acid, butyric acid, valeric acid, caproic acid, caprylic acid, lauric acid, tridecylic acid, myristic acid, palmitic acid, stearic acid, pivalic acid, and isobutyric acid; alicyclic monocarboxylic acids such as cyclohexanecarboxylic acid; aromatic monocarboxylic acids such as benzoic acid, toluic acid, α-naphthalene carboxylic acid, β-naphthalene carboxylic acid, methylnaphthalene carboxylic acid, and phenylacetic acid; aliphatic dicarboxylic acids such as adipic acid, and pimelic acid; alicyclic dicarboxylic acids such as 1,3-cyclopentanedicarboxylic acid, 1,3-cyclohexanedicarboxylic acid, and 1,4-cyclohexanedicarboxylic acid; and aromatic dicarboxylic acids such as phthalic acid and isophthalic acid. One kind or two or more kinds of them may be used. Although the used amount of these molecular weight modifying agents varies depending on the reactivity and the polymerization condition of the molecular weight modifying agent, the relative viscosity of the polyamide to be finally obtained is suitably determined so as to be within the range as described above.

Considering the stability during rotational molding, the terminal of the molecular chain of the semi-aromatic polyamide is preferably capped with an end-capping agent, 10% or more of the terminal group is more preferably capped, and 20% or more of the terminal group is further preferably capped. The end-capping agent is not particularly limited as long as it is a monofunctional compound having a reactivity with the amino group or the carboxylic group at the terminal of the polyamide. However, in terms of the reactivity and the stability of the capped terminal, a monocarboxylic acid or a monoamine is preferred, and in terms of easy handling, a monocarboxylic acid is more preferred. Additionally, an acid anhydride such as phthalic anhydride; a monoisocyanate, a monoacid halide, a monoester, or a monoalcohol can be used.

The monocarboxylic acid used as the end-capping agent is not particularly limited as long as it has the reactivity with the amino group. Examples include aliphatic monocarboxylic acids, alicyclic monocarboxylic acids, and aromatic monocarboxylic acids as described above. Among these, in terms of the reactivity, the stability of the capped terminal, and the price, preferred is acetic acid, propionic acid, butyric acid, valeric acid, caproic acid, caprylic acid, lauric acid, tridecylic acid, myristic acid, palmitic acid, stearic acid, or benzoic acid. The monoamine used as the end-capping agent is not particularly limited as long as it has the reactivity with the carboxyl group. Examples include aliphatic monoamines, alicyclic monoamines, and aromatic monoamines as described above. Among these, in terms of the reactivity, the boiling point, the stability of the capped terminal, and the price, preferred is butylamine, hexylamine, octylamine, decylamine, stearylamine, cyclohexylamine, or aniline.

The used amount of the end-capping agent can be suitably selected, considering the reactivity and the boiling point of the used end-capping agent, the reaction apparatus, and the reaction condition. In terms of adjusting the polymerization level, the amount is preferably 0.1 mol % or more and 15 mol % or less based on the total moles of the dicarboxylic acid and the diamine which are raw components.

Polyamide Resin Composition

The polyamide resin composition according to the present invention contains a polyamide resin as the component (A), an acid-modified polyolefin as the component (B), and a non-modified polyolefin as the component (C). Hereinafter, in the description of the blending ratio of each component, it assumes that the blending amount of the component (A) is a parts by weight, the blending amount of the component (B) is b parts by weight, and the blending amount of the component (C) is c parts by weight.

In the present invention, it is important that the ratio (%) of the component (C) to the total of the component (B) and the component (C) satisfies the following equation:

$$50 \leq c/(b+c) \times 100 \leq 70.$$

By satisfying this equation, a core-shell structure can be formed by the component (B) and the component (C), and therefore the rotational molded article obtained can have both the surface property and the low-temperature impact resistance. If the $c/(b+c) \times 100$ is less than 50, the low-temperature impact resistance of the polyamide resin composition obtained is decreased. If the $c/(b+c) \times 100$ is more than 70, the surface property of the rotational molded article is impaired because of the phase separated non-modified polyolefin. The c/(b+c)×100 is preferably 53 or more, and is more preferably 56 or more. The c/(b+c)×100 is preferably 68 or less, and is more preferably 66 or less.

In the present invention, it is important that the ratio (%) of the total of the component (B) and the component (C) to the total of the component (A) and the component (B) and the component (C) satisfies the following equation:

$$10 \leq (b+c)/(a+b+c) \times 100 \leq 40.$$

By satisfying this equation, the rotational molded article obtained can have both the surface property and the low-temperature impact resistance. If the (b+c)/(a+b+c)×100 is less than 10, the low-temperature impact resistance of the rotational molded article obtained is decreased. If the (b+c)/(a+b+c)×100 is more than 40, a particulate tends to remain at the surface of the rotational molded article obtained. The c(b+c)/(a+b+c)×100 is preferably 15 or more, and is more preferably 20 or more. The c(b+c)/(a+b+c)×100 is preferably 37 or less, and is more preferably 34 or less.

Preferably, the polyamide resin composition according to the present invention further contains the semi-aromatic polyamide as the component (D). Then, when the blending amount of the component (D) is d parts by weight, the following equation is preferably satisfied:

$$1 \leq d/(a+b+c+d) \times 100 \leq 20.$$

By satisfying this equation, the heat resistance of the polyamide resin composition obtained can be improved. The d/(a+b+c+d)×100 is preferably 3 or more, and is more preferably 5 or more. The d/(a+b+c+d)×100 is preferably 18 or less, and is more preferably 16 or less.

The polyamide resin composition of the present invention may contain a typically blended various type of an additive or a modifying agent, such as a heat-resistant agent, a heat stabilizer, an UV absorber, a light stabilizer, an antioxidant, an anti-static agent, a lubricant, an anti-blocking agent, a filler, a tackifying agent, a sealing property improving agent, an anti-fog agent, a crystal nucleating agent, a mold release agent, a plasticizer, a crosslinking agent, a foaming agent, a colorant (a pigment, a dye, or the like), an anti-bending fatigue property improving agent, or a spreading agent, as long as the properties of the rotational molded article obtained is not impaired.

Examples of the heat-resistant agent include phenol-based antioxidants, thioether-based antioxidants, and phosphorus-based antioxidants. The heat-resistant agent is preferably at least one selected from the group consisting of the phenol-based antioxidants and the phosphorus-based antioxidants, and is more preferably at least one selected from the group consisting of hindered phenol-based antioxidants having a t-butyl group at the ortho position, and phosphite ester-based antioxidants of a phenol having a t-butyl group at the ortho position. Examples of the heat-resistant agent commercially available include Irganox™ series, Sumilizer™ series, Adekastub™ series, and Irgafos™ series.

Specific examples of the phenol-based antioxidant include N,N'-hexamethylene bis(3,5-di-t-butyl-4-hydroxyhydrocinnamamide, pentaerythrityl-tetrakis[3-(3,5-di-t-butyl-4-hydroxyphenyl)-propionate, ethylene bis(oxyethylene)bis[3-(5-tert-butyl-4-hydroxy-m-tolyl)propionate], and 3,9-bis[2-[3-(3-tert-butyl-4-hydroxy-5-methylphenyl)propionyloxy]-1,1-dimethylethyl]-2,4,8,10-tetraoxaspiro[5.5]undecane. Specific examples of the thioether-based antioxidant include distearyl-3,3-thiodipropionate, pentaerythrityl-tetrakis(3-laurylthiopropionate), and didodecyl(3,3'-thiodipropionate). Specific examples of the phosphorus-based antioxidant include tris(2,4-di-t-butylphenyl)phosphite, bis(2,6-di-t-butyl-4-methylphenyl)pentaerythritol diphosphite, reaction products of biphynyls containing tetrakis(2,4-di-tert-butylphenoxy)-4,4-biphynyldiphosphine as a main component, phosphorus trichloride, and 2,4-di-tert-butylphenol. One kind of the heat-resistant agent may be used alone, or two or more kinds of them may be used in combination.

The content of the heat-resistant agent is preferably 0.01 parts by weight or more and 1.50 parts by weight or less based on 100 parts by mass of the polyamide resin composition. The content of the mold release agent is preferably 0.01 parts by weight or more and 0.60 parts by weight or less based on 100 parts by mass of the polyamide resin composition. The content of the anti-static agent is preferably 0.01 parts by weight or more and 0.20 parts by weight or less based on 100 parts by mass of the polyamide resin composition. The content of the spreading agent is preferably 0.01 parts by weight or more and 0.20 parts by weight or less based on 100 parts by mass of the polyamide resin composition.

Polyamide Resin Composition for Rotational Molding and Rotational Molded Article The polyamide resin composition for rotational molding according to the present invention uses the polyamide resin composition described above. The rotational molded article according to the present invention uses the polyamide resin composition for rotational molding described above. The molding of the polyamide resin composition for rotational molding by rotational molding method can be performed by the following method.

Firstly, a metal mold is attached to a known rotational molding apparatus which can turn, invert or move in a pendulum motion at single axis or multiple axes, and a powder or a mixture of a powder and a pellet which is obtained by homogeneously mixing a polyamide resin composition for rotational molding and a nucleating agent is charged in the metal mold. Then, the temperature inside the metal mold is heated to a temperature between (the melting point+5° C.) and (the melting point+80° C.) of the polyamide resin composition for rotational molding used. The polyamide resin composition for rotational molding is molded while melting at this temperature. After that, the metal mold is cooled at a temperature between the glass transition temperature of the polyamide resin composition for rotational molding and (the melting point −10° C.) to cool and solidify the rotational molded article completely. After that, the rotational molded article is removed from the metal mold. The cooling time varies depending on the thickness of the rotational molded article, but the time is within the range of several minutes to several hours. During rotational molding, in order to prevent coloring and the deterioration of the rotational molded article, an inert gas atmosphere such as nitrogen gas is preferred so that it is substantially free of oxygen inside the metal mold. Also, when the polyamide resin composition is charged to the metal mold in the rotational molding method, the polyamide resin composition for rotational molding can be charged in a melted form.

The rotational molded article obtained is suitable for pressurized gas containers, fuel tanks, and the like.

EXAMPLES

Hereinafter, the present invention will be specifically described by the Examples.

Example 1

Polyamide 6 (PA6, manufactured by Ube Industries, Ltd., product name: 1011FB, $\eta n=2.20$) in an amount of 68.8 parts by weight, a maleic anhydride-modified ethylene-α-olefin copolymer (MAH-PEAO, manufactured by Mitsui Chemicals, Inc., product name: TAFMER MH5020, density=0.866) in an amount of 10 parts by weight, a non-modified polyethylene (PE, manufactured by Prime Polymer Co., Ltd., product name: EVOLUE SP0540, MFR value=3.8) in an amount of 13.2 parts by weight, a semi-aromatic polyamide (Semi-aromatic PA, manufactured by DOW-MITSUI POLYCHEMICALS, product name: Sealer PA3426) in an amount of 8.0 parts by weight, a phenol-based antioxidant (a hindered phenol-based antioxidant having a t-butyl group at the ortho position) in an amount of 0.50 parts by weight, a phosphorus-based antioxidant (a phosphite ester-based antioxidant of a phenol having a t-butyl group at the ortho position) in an amount of 0.50 parts by weight, a mold release agent in an amount of 0.10 parts by weight, an anti-static agent in an amount of 0.10 parts by weight, and a spreading oil in an amount of 0.10 parts by weight were dry-blended. After that, the blended mixture was melted and kneaded by a twin-screw kneader manufactured by Werner & Pfleiderer (product name: ZSK32Mc+) to obtain a pellet of a polyamide resin composition. The pellet obtained was injection molded at a cylinder temperature of 270° C. and a metal mold temperature of 80° C. to produce various test samples, and then the properties were evaluated. The results obtained are shown in TABLE 1.

Examples 2 to 6 and Comparative Examples 1 to 6

Polyamide resin compositions were obtained by the same method as in Example 1 except that the kind of the component (A) and/or the blending ratio of the components (A) to (D) were changed as described in TABLE 1. In Examples 3 to 6, Polyamide 6 (PA6, manufactured by Ube Industries, Ltd., product name: 1013B, $\eta r=2.45$) was used as the component (A), which is different from that of Example 1. In Comparative Example 3, Polyamide 6 (PA6, manufactured by Ube Industries, Ltd., product name: 1015B, $\eta r=2.60$) was used as an component (A') which does not satisfy the requirements of the component (A), as a substitute for the component (A). In Comparative Examples 4 to 5, a maleic anhydride-modified ethylene-α-olefin copolymer (MAH-PEAO, manufactured by Mitsui Chemicals, Inc., product name: TAFMER MA9015, density=0.896) or a maleic acid-modified ethylene-α-olefin copolymer (MA-PEAO, manufactured by Mitsui Chemicals, Inc., product name: ADMER NB550, density=0.920) was used as an component (B') which does not satisfy the requirements of the component (B), as a substitute for the component (B). In Comparative Example 6, an ultra-high flow polyethylene (PE, manufactured by Prime Polymer Co., Ltd., product name: NEO-ZEX40300J, MFR value=36) was used as an component (C') which does not satisfy the requirements of the component (C), as a substitute for the component (C).

Evaluation of Liquidity

As an index of the liquidity, the apparent viscosity $\eta a$ was measured by using a capillary rheometer (manufactured by Toyo Seiki Seisaku-sho, Ltd., product name: Capilograph 1D) under the conditions of 250° C. and an apparent shear rate of 365 [1/sec]. The liquidity was evaluated as described below.
∘ ∘: less than 250
∘: from 250 to 450
x: more than 450

Evaluation of Surface Property

As an index of the surface property, a SUS cylinder container including a predetermined amount of a resin powder obtained by freezing and milling a pellet was heated on a hot plate set at 290° C. in air for 5 min. After that, the molded article obtained was removed from the container, and the surface of the molded article was observed visually. The surface property was evaluated as described below.
∘ ∘: The surface had no unevenness.
∘: The surface had unevenness but is smooth.
x: The surface property was poor, such that the surface had unevenness and a particulate before heating remained.

Evaluation of Low-Temperature Impact Resistance

As an index of the low-temperature impact resistance, the Charpy impact strength with a notch at −60° C. according to ISO 179/1eA was measured. The low-temperature impact resistance was evaluated as described below.
∘ ∘: more than 12 kJ/m$^2$
∘: from 8 to 12 kJ/m$^2$
x: less than 8 kJ/m$^2$

Evaluation of Mechanic Property

As an index of the low-temperature impact resistance, the nominal tensile strain at break at 23° C. according to ISO 527-1,2 (tensile test) was measured. The mechanic property was evaluated as described below.
∘ ∘: more than 250%
∘: from 150 to 250%
x: less than 150%

Evaluation of Heat Resistance

As an index of the heat resistance, the ΔE of the test sample was measured during the treatment of the sample in an oven set at 200° C. in air for 6 hours, in which the test sample was obtained by injection molding of the pellet obtained at a cylinder temperature of 270° C. and a metal mold temperature of 80° C.

TABLE 1

| | | | Example | | | | | | Comparative Example | | | | | |
|---|---|---|---|---|---|---|---|---|---|---|---|---|---|---|
| | | | 1 | 2 | 3 | 4 | 5 | 6 | 1 | 2 | 3 | 4 | 5 | 6 |
| (A) | PA6 (1011FB) | parts by weight | 68.8 | 61.8 | | | | | 60.2 | 76.0 | | 68.8 | 68.8 | 68.8 |
| (A) | PA6 (1013B) | parts by weight | | | 72.0 | 61.8 | 68.8 | 76.8 | | | | | | |

TABLE 1-continued

|  |  |  | Example | | | | | | Comparative Example | | | | | |
|---|---|---|---|---|---|---|---|---|---|---|---|---|---|---|
|  |  |  | 1 | 2 | 3 | 4 | 5 | 6 | 1 | 2 | 3 | 4 | 5 | 6 |
| (A') | PA6 (1015B) | parts by weight |  |  |  |  |  |  |  |  | 68.8 |  |  |  |
| (B) | MAH-PEAO (MH5020) | parts by weight | 10.0 | 13.0 | 6.8 | 10.0 | 10.0 | 10.0 | 6.8 | 10.0 | 10.0 |  |  | 10.0 |
| (B') | MAH-PEAO (MA9015) | parts by weight |  |  |  |  |  |  |  |  |  | 10.0 |  |  |
| (B') | MA-PEAO (NB550) | parts by weight |  |  |  |  |  |  |  |  |  |  | 10.0 |  |
| (C) | PE (SP0540) | parts by weight | 13.2 | 17.2 | 13.2 | 13.2 | 13.2 | 13.2 | 25.0 | 6.0 | 13.2 | 13.2 | 13.2 |  |
| (C) | PE (40300J) | parts by weight |  |  |  |  |  |  |  |  |  |  |  | 13.2 |
| (D) | Semi-aromatic PA | parts by weight | 8.0 | 8.0 | 8.0 | 15.0 | 8.0 | 0 | 8.0 | 8.0 | 8.0 | 8.0 | 8.0 | 8.0 |
| c/(b + c) × 100 | | | 56.9 | 57.0 | 66.0 | 56.9 | 56.9 | 56.9 | 78.6 | 37.5 | 56.9 | 0 | 0 | 100 |
| (b + c)/(a + b + c) × 100 | | | 25.2 | 32.8 | 21.7 | 27.3 | 25.2 | 23.5 | 34.6 | 17.4 | 100 | 12.2 | 12.2 | 87.3 |
| Evaluation of liquidity | | | ⊚ | ⊚ | ○ | ○ | ○ | ○ | ⊚ | ⊚ | x | ⊚ | ⊚ | ⊚ |
| (Apparent viscosity ηa) | | | 184 | 232 | 310 | 408 | 351 | 319 | 218 | 165 | 547 | 243 | 199 | 243 |
| Evaluation of surface property | | | ⊚ | ⊚ | ⊚ | ○ | ○ | ○ | x | ⊚ | x | ○ | ⊚ | x |
| Evaluation of low-temperature impact resistance | | | ○ | ⊚ | ○ | ⊚ | ○ | ○ | ○ | x | ○ | ○ | x | ○ |
| (Charpy impact strength) | | | 10.0 | 13.0 | 10.5 | 12.5 | 10.9 | 8.3 | 12.6 | 6.4 | 9.4 | 8.8 | 5.8 | 10.2 |
| Evaluation of mechanic property | | | ⊚ | ⊚ | ⊚ | ⊚ | ⊚ | ○ | ⊚ | x | ⊚ | x | x | x |
| (Tensile elongation) | | | 263 | 279 | 295 | 292 | 241 | 158 | 303 | 132 | 266 | 50 | 41 | 40 |
| Evaluation of heat resistance (ΔE) | | | — | — | — | 37.0 | 40.8 | 44.4 | — | — | — | — | — | — |

As described above, it is found that polyamide resin compositions including the component (A), the component (B), and the component (C) in a predetermined ratio has excellent low-temperature impact resistance and surface property (Examples 1 to 6).

What is claimed is:

1. A polyamide resin composition, comprising:
   a component (A) in an amount of a parts by weight, which is an aliphatic polyamide having a relative viscosity ηr of less than 2.6 as measured according to JIS K6920 under the conditions of 96 wt % of sulfuric acid, 1 wt % of the polymer concentration, and 25° C.;
   a component (B) in an amount of b parts by weight, which is an acid-modified or epoxy-modified polyolefin having a density of 0.895 g/cm$^3$ or less as measured according to ASTM D1505;
   a component (C) in an amount of c parts by weight, which is a non-modified polyolefin having an MFR value of 3.0 to 30 g/10 min as measured in a load of 2.16 kg at 190° C.; and
   a component (D) in an amount of d parts by weight, which is a poly(hexamethylene terephthalamide/hexamethylene isophthalamide) copolymer (Polyamide 6T/6I) as a semi-aromatic polyamide;
   wherein the polyamide resin composition satisfies the following equations:

$50 \leq c/(b+c) \times 100 \leq 70$, $10 \leq (b+c)/(a+b+c) \times 100 \leq 40$, and $1 \leq d/(a+b+c+d) \times 100 \leq 20$.

2. The polyamide resin composition according to claim 1, wherein the aliphatic polyamide is a polyamide 6.

3. The polyamide resin composition according to claim 1, wherein the modified polyolefin is a maleic anhydride-modified ethylene-α-olefin copolymer.

4. A polyamide resin composition for rotational molding comprising the polyamide resin composition according to claim 1.

5. A rotational molded article comprising the polyamide resin composition for rotational molding according to claim 4.

* * * * *